United States Patent [19]

Mitoma et al.

[11] Patent Number: 5,611,723
[45] Date of Patent: Mar. 18, 1997

[54] APPARATUS FOR MODIFYING ATTITUDE OF GOLF BALL HAVING BURRS FORMED THEREON AND DEBURRING MACHINE EMPLOYING THE SAME

[75] Inventors: Shiro Mitoma; Kazuya Shiroiwa, both of Osaka, Japan

[73] Assignee: Hinode Engineering Co., Ltd., Japan

[21] Appl. No.: 494,542

[22] Filed: Jun. 26, 1995

[30] Foreign Application Priority Data

Feb. 24, 1995 [JP] Japan .................................. 7-036723

[51] Int. Cl.$^6$ .......................... B24B 49/00; B24B 51/00
[52] U.S. Cl. .................... 451/6; 451/49; 451/50
[58] Field of Search ..................... 156/146, 94; 451/49, 451/50, 246, 247, 6, 32, 9, 59, 244; 382/141, 143

[56] References Cited

U.S. PATENT DOCUMENTS

| | | | |
|---|---|---|---|
| 2,075,216 | 3/1937 | Mancuso | 451/50 |
| 2,438,239 | 3/1948 | Toulmin, Jr. | 451/50 |
| 3,640,028 | 2/1972 | Richard | 451/50 |
| 4,325,125 | 4/1982 | Buchfeld . | |
| 4,536,993 | 8/1985 | Shimizu et al. . | |
| 4,779,387 | 10/1988 | Reid et al. | 451/9 |
| 4,794,736 | 1/1989 | Fuwa et al. . | |
| 4,894,958 | 1/1990 | Takasaki | 451/50 |
| 4,987,702 | 1/1991 | Anschutz | 451/32 |
| 5,004,930 | 4/1991 | Gremaud et al. . | |
| 5,020,803 | 6/1991 | Gendreau et al. | 273/225 |
| 5,255,199 | 10/1993 | Barkman et al. . | |
| 5,343,218 | 8/1994 | Maeda | 345/116 |
| 5,389,169 | 2/1995 | McRae | 156/98 |
| 5,390,932 | 2/1995 | Russo, Sr. | 273/220 |
| 5,472,330 | 12/1995 | Oka et al. | 451/6 |

FOREIGN PATENT DOCUMENTS

| | | |
|---|---|---|
| 2194450 | 3/1988 | United Kingdom . |
| 2200584 | 8/1988 | United Kingdom . |
| 2273058 | 6/1994 | United Kingdom . |

*Primary Examiner*—James G. Smith
*Assistant Examiner*—Derris H. Banks
*Attorney, Agent, or Firm*—James Ray & Associates

[57] ABSTRACT

An apparatus for modifying the attitude of a golf ball having burrs formed thereon, the apparatus having a second station in which a CCD camera takes image data of the golf ball while rotating, one time, the golf ball around the X-axis by a step motor, and the rotational angle around the X-axis and that around the Z-axis, with which the equator having burrs formed thereon are required to be horizontal, are calculated in accordance with the image data; fourth and fifth stations in which step motors rotate the golf ball around the X-axis and Z-axis by the foregoing angles to-modify the attitude of the golf ball; and a sixth station in which a CCD camera takes image data of the golf ball to finely modify the attitude of the golf ball by step motors.

17 Claims, 12 Drawing Sheets

APPARATUS FOR MODIFYING ATTITUDE OF GOLF BALL HAVING BURRS FORMED THEREON AND DEBURRING MACHINE EMPLOYING THE SAME

BACKGROUND OF THE INVENTION

1. Field of the Invention

This invention relates to an apparatus for modifying the attitudes of a golf ball to remove, from the golf ball, burrs formed at the time of molding the golf ball in such a manner that the burrs are caused to face a predetermined direction.

More particularly, the present invention relates to a deburring machine using an attitude modifying apparatus of the foregoing type to automatically remove burrs from a golf ball.

2. Description of the Related Art

Since golf balls are usually (rubber- or resin-) molded by using a pair of molds, burrs so called "flashes" and pin burrs, are formed on the equator of the golf ball which corresponds to the joint surfaces of the molds. Although burrs of the foregoing type can be removed by a grinder or the like, the golf ball must be, one by one, set to the jig of the grinder in such a manner that the directions of the burrs are caused to face a predetermined direction. Hitherto, the foregoing setting operation has been performed manually and a heavy labor and long time have been required.

As described above, there arises a problem in that a heavy labor and a long time have been required to remove burrs from golf balls and to modify the attitude of each golf ball.

SUMMARY OF THE INVENTION

In view of the foregoing, an object of the present invention is to provide an apparatus for modifying the attitudes of a golf ball having burrs formed thereon that is capable of automatically modifying the attitude of the golf ball in such a manner that the burrs face a predetermined direction.

Another object of the present invention is to provide a deburring machine using the attitude modifying apparatus to automatically remove burrs from a golf ball.

According to one aspect of the present invention, there is provided an apparatus for modifying the attitude of a golf ball having burrs formed thereon, comprising: rotating means for rotating, one time, a golf ball, which has burrs formed on the equator thereof, around an axis that passes through the center of the golf ball while holding the golf ball; photographing means for photographing the golf ball rotated one time by the rotating means; calculating means for recognizing the position of the equator having burrs formed thereon in accordance with image data of the golf ball obtained by the photographing means and for calculating the quantity of rotation required to modify the equator into a predetermined direction; and modifying means that rotates the golf ball by the quantity of rotation calculated by the calculating means to modify the attitude of the golf ball.

A structure may be employed, in which the rotating means includes a first rotating unit for rotating, one time, the golf ball around a first axis of a three-dimensional coordinates, the origin of which is the center of the golf ball, and a second rotating unit for rotating, one time, the golf ball around a second axis which is perpendicular to the first axis, the photographing means includes a first photographing unit for photographing the golf ball which is rotated by the first rotating unit and a second photographing unit for photographing the golf ball which is rotated by the second rotating unit, the calculating means calculates the quantity of rotation required for modification in accordance with image data if the position of the equator having burrs formed thereon has been recognized in accordance with the image data obtained by the first photographing unit, and if the position has not been recognized, then the calculating means uses image data obtained by the second photographing unit to recognize the position of the equator having burrs formed thereon and to calculate the quantity of rotation required for the modification.

The modifying means may include a first modifying unit for rotating the golf ball around a first axis of a three-dimensional coordinates, the origin of which is the center of the golf ball, and a second modifying unit for rotating the golf ball around a second axis which is perpendicular to the first axis.

A structure may be employed which further comprises a third photographing unit for photographing the golf ball, the attitude of which has been modified by the modifying means, and a fine adjustment unit for finely adjusting the attitude of the golf ball, wherein the calculating means discriminates whether or not the equator having burrs formed thereon faces a predetermined direction in accordance with the image data obtained by the third photographing unit and causes the fine adjustment means to finely adjust the attitude of the golf ball if the equator is shifted from a predetermined direction.

A structure may be employed which further comprises conveyance means for conveying the golf ball in a sequential order as the first rotating unit, the second rotating unit, the first modifying unit, the second modifying unit and the fine adjustment unit.

The calculating means may recognize the position of the equator having burrs formed thereon in accordance with the shade and shadow of the burrs, then calculate the positions of dimples arranged on the two sides of the recognized equator, and then use the positions of the dimples to correct the position of the equator.

According to another aspect of the present invention, there is provided a deburring machine for a golf ball, comprising: an attitude modifying apparatus that recognizes the position of an equator of a golf ball having burrs formed thereon in accordance with image data obtained by photographing the golf ball while rotating, one time, the golf ball around an axis passing through the center of the golf ball so as to modify the attitude of the golf ball in such a manner that the equator plane faces a predetermined direction; and a grinding apparatus that holds the golf ball from a direction perpendicular to the equator plane caused to face the predetermined direction by the attitude modifying apparatus and that presses the halfway of the golf ball against copying rollers while rotating the golf ball so as to bring the equator having the burrs formed thereon into contact with a completion cutter so that the burrs are removed.

In the apparatus for modifying the attitude of a golf ball having burrs formed thereon, the photographing means takes image data of the golf ball while causing the rotating means to rotate the golf ball one time, the calculating means recognizes the position of the equator having burrs formed thereon in accordance with the image data and calculates the quantity of rotation required to modify the equator into a predetermined direction, and the modifying means rotates the golf ball by the calculated quantity of rotation so that the attitude of the golf ball is modified.

If the first and second rotating units for rotating, one time, the golf ball around the first and second axes, which are perpendicular to each other, and first and second photographing units corresponding to the first and second rotating units are provided, the equator can be recognized in accordance with the image data obtained by the second photographing unit in a case where the position of the equator having burrs formed thereon cannot be recognized in accordance with the image data obtained by the first photographing unit. Thus, recognition of the attitude of a golf ball can further reliably be performed.

If the attitude of the golf ball is modified by the first and second modifying units for rotating the golf ball around the first and second axes that are perpendicular to each other, the two rotative operations around the first axis and around the second axis enable the attitude of the golf ball to easily be modified regardless of the direction of the golf ball.

If the golf ball, then attitude of which has been modified by the modifying means, is photographed by the third photographing unit and the attitude of the golf ball is finely adjusted by the fine adjustment unit, the attitude of the golf ball can further finely be modified and the reliability of the attitude modification can be improved.

If the conveyance means conveys the golf ball in the sequential order as the first and second rotating units, the first and second modifying units and the fine adjustment unit, automatic modification of the attitude of a golf ball can be facilitated.

If the structure is so constituted that the calculating means recognizes the position of the equator in accordance with the shade and shadow of the burrs and uses the positions of the dimples arranged on the two sides of the recognized equator to correct the position of the equator, the accuracy in recognizing the position of the equator can be improved and the attitude of the golf ball can finely be modified.

In the deburring machine according to the present invention, the attitude modifying apparatus rotates the golf ball one time and as well as recognizes the position of the equator having burrs formed thereon in accordance with image data of the golf ball so that the attitude of the golf ball is modified; and then the grinding apparatus holds the golf ball and presses the halfway of the golf ball against the copy rollers while rotating the golf ball to bring the equator having burrs formed thereon into contact with the completion cutter so that the burrs are ground.

DESCRIPTION OF THE PREFERRED EMBODIMENTS

A preferred embodiment of the present invention will now be described with reference to the drawings.

Figure 1:
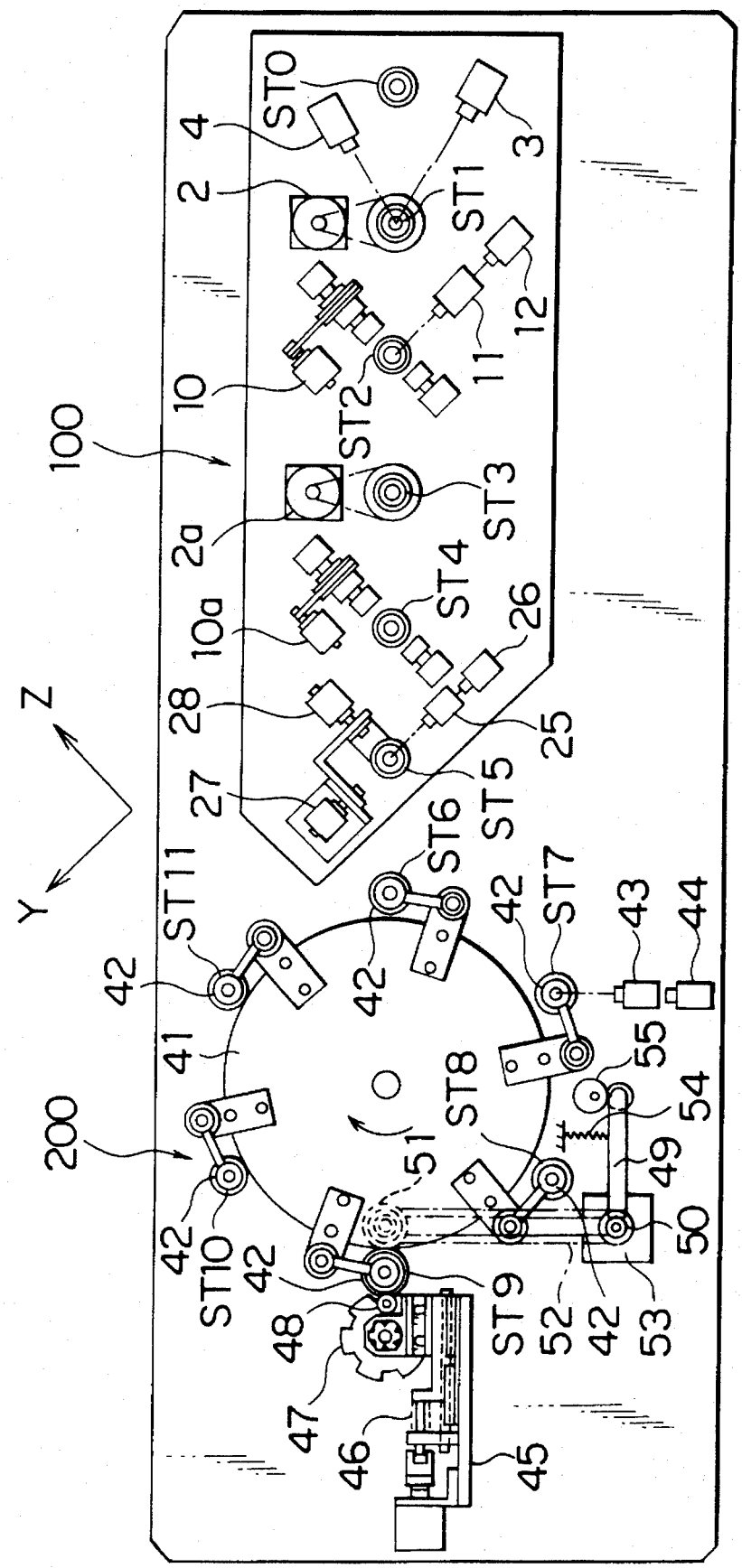
FIG. 1 is a plan view showing a deburring machine for a golf ball according to an embodiment of the present invention.

FIG. 1 shows an embodiment of a machine for removing burrs from a golf ball according to the present invention. The deburring machine according to this embodiment comprises an attitude modifying apparatus 100 for sequentially modifying the attitudes of golf balls supplied unconditionally to cause the equator of each golf ball having formed burrs to face a predetermined direction; and a grinding apparatus 200 for grinding the burrs on the equator that have been caused to face a predetermined direction by the attitude modifying apparatus 100.

The attitude modifying apparatus 100 includes first to sixth stations ST0 to ST5 on each of which the golf ball is placed, the first to-sixth stations ST0 to ST5 being disposed straight at the same intervals.

Figure 2:
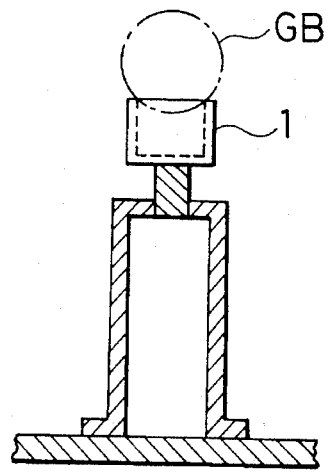
FIG. 2 is a cross sectional view showing the structure of a first station.

The first station ST0 is a station to which the golf ball is supplied from a previous process, the first station ST0 having a cup 1 on which the golf ball GB is placed as shown in FIG. 2.

Figure 3:
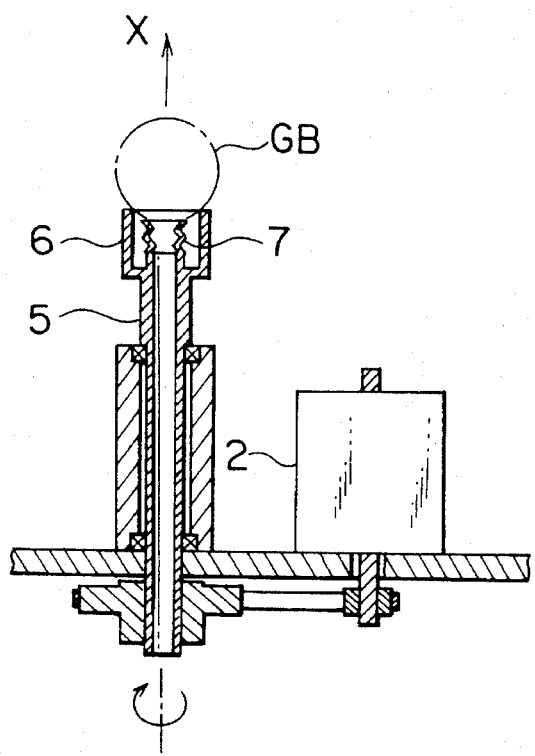
FIG. 3 is a cross sectional view showing the structure of a first rotating unit.

The second station ST1 is a station for photographing the golf ball GB while rotating the same around a vertical axis (the X-axis) one time so as to take image data, the second station ST1 having a first rotating unit shown in FIG. 3. Furthermore, a first photographing unit, which comprises a lighting unit 3 for irradiating the golf ball GB with light and a CCD camera 4 for photographing the golf ball GB, is disposed adjacent to the second station ST1. The lighting unit 3 and the CCD camera 4 are disposed on the horizontal plane, the height of which is the same as the height of the golf ball GB, in such a manner that each of the lighting unit 3 and the CCD camera 4 makes an angle of 30 from a straight line drawn through first to sixth stations ST0 to ST5. Referring to FIG. 3, the first rotating unit has a cup 6 at the top end of a suction pipe 5 thereof that is disposed vertically, the cup 6 including an adsorption pad 7 connected to a-suction unit (not shown) through the suction pipe 5. When the suction unit is operated, the golf ball GB is adsorbed to the adsorption pad 7 so that the golf ball GB is secured to the upper surface of the cup 6. The suction pipe 5 is disposed rotatively around the vertical axis so as to be, together with the cup 6 and the golf ball GB adsorbed and secured to the upper surface of the cup 6, rotated by a step motor 2.

Figure 4:
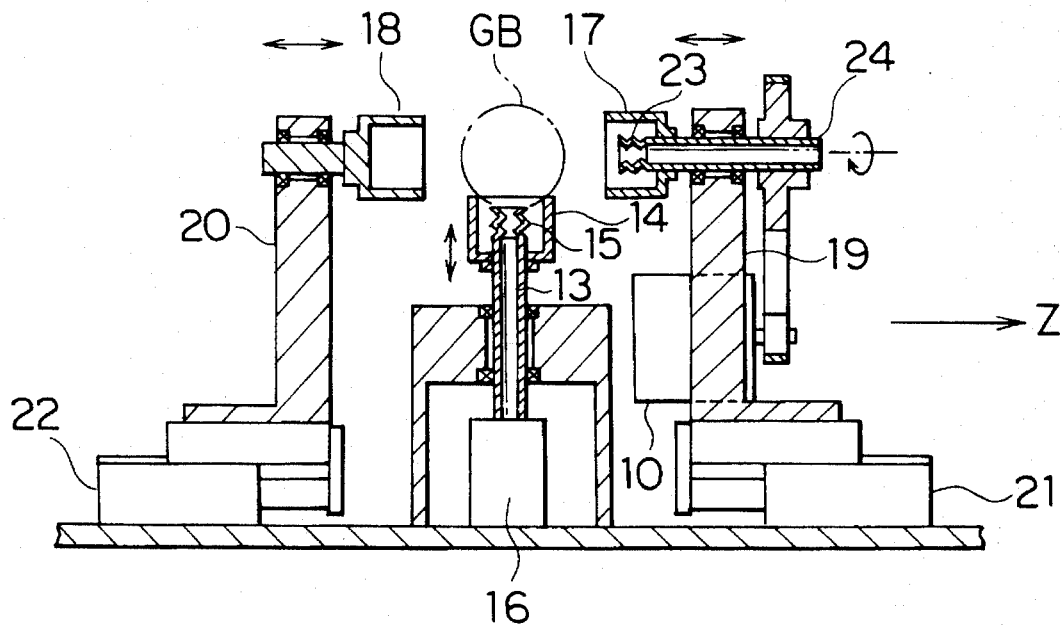
FIG. 4 is a cross sectional view showing the structure of a second rotating unit.

The third station ST2 is a station for photographing the golf ball GB while rotating, one time, the same around a horizontal axis (the Z-axis) so as to take image data, the third station ST2 having a second rotating unit shown in FIG. 4. Furthermore, a second photographing unit, which comprises a lighting unit 11 for irradiating the golf ball GB with light and a CCD camera 11 for photographing the golf ball GB, is disposed adjacent to the third station ST2, the second photographing unit being disposed on the vertical plane (the XY-plane). Each of the Y and Z axes is so set as to make an angle of 45 from a straight line drawn through the first to sixth stations ST0 to ST5. Referring to FIG. 4, the second rotating unit has a cup 14 at the top end of a suction pipe 13 thereof that is disposed vertically, the cup 14 including an adsorption pad 15 connected to a suction unit (not shown) through the suction pipe 13. When the suction unit is operated, the golf ball GB is adsorbed to the adsorption pad 15 so that the golf ball GB is secured to the upper surface of the cup 14. The suction pipe 13 is so disposed as to be capable of moving vertically.

A pair of cups 17 and 18 are respectively disposed on the two sides of the golf ball GB in the direction of the Z-axis, the cups 17 and 18 being respectively so disposed in the upper portions of supporting arms 19 and 20 as to be capable of rotating around the Z-axis. The supporting arms 19 and 20 are so structured as to be capable of moving horizontally in the direction of the Z-axis by corresponding cylinders 21 and 22. The cup 17 includes an adsorption pad 23 that is connected to a suction unit (not shown) through a suction pipe 24 forming a rotational shaft for the cup 17. The suction pipe 24 is, by a step motor 10 secured to the supporting arm 19, rotated together with the cup 17.

The fourth station ST3 is a station for modifying the attitude of the golf ball GB by rotating the golf ball GB around the vertical axis (the X-axis) so that the equator having burrs formed thereon appears to be one straight line on the front side when viewed from a direction of the Z-axis. The fourth station ST3 has a first modifying unit having a similar structure as that of the first rotating unit shown in FIG. 3 and comprising a step motor 2a.

The fifth station ST4 is a station for rotating the golf ball GB around the Z-axis to modify the attitude of the golf ball GB so that the equator having burrs formed thereon is made horizontal. The fourth station ST3 has a second modifying unit having a similar structure as that of the second rotating unit shown in FIG. 4 and comprising a step motor 10a.

Figure 5:
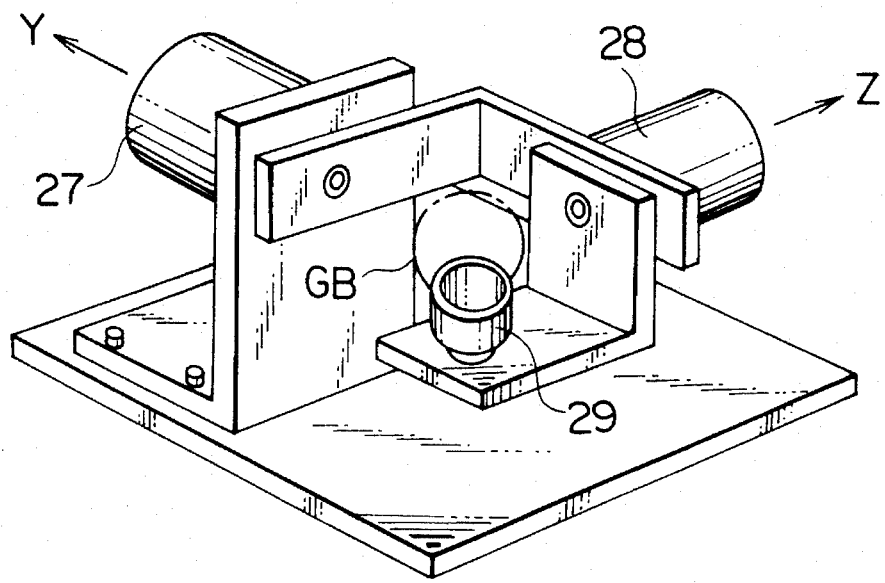
FIG. 5 is perspective view showing the structure of a fine adjustment unit.

The sixth station ST5 is a station for finely adjusting the modified attitude of the golf ball GB while photographing the golf ball GB, the sixth station ST5 having a fine adjustment unit shown in FIG. 5. Furthermore, a third photographing unit, which comprises a lighting unit 25 for irradiating the golf ball GB with light and a CCD camera 26 for photographing the golf ball GB, is disposed adjacent to the sixth station ST5, the third photographing unit being disposed on the vertical plane (the XY-plane). Referring to FIG. 5, the fine adjustment unit comprises a step motor 27 disposed in the direction of the Y-axis and a step motor 28 disposed in the direction of the Z-axis. The step motor 28 rotates a cup 29, which receives the golf ball GB, around the Z-axis, while the step motor 27 rotates both the cup 29 and the step motor 28 around the Y-axis.

The grinding apparatus 200 is disposed adjacent to the attitude modifying apparatus 100 that has the foregoing structure. The grinding apparatus 200 has a structure disclosed in the applicant of the present invention in Japanese Patent Laid-Open No. 63-174801, the grinding apparatus 200 having six holders 42 disposed at the same intervals around a circular dividing table 41. The circular dividing table 41 intermittently revolves clockwise by 60 each, causing each holder 42 to be moved by an angular degree of 60. Thus, seventh to twelfth stations ST6 to ST11 are constituted. The seventh station ST6 is disposed on the extension of the straight configuration of the first to sixth stations ST0 to ST5 and apart from the sixth station ST5 by the same distance as each of the intervals among the first to sixth stations ST0 to ST5 of the attitude modifying apparatus 100.

Each holder 42 has a pair of an upper cup and a lower cup disposed to face each other in the vertical direction so as to hold the golf ball GB from the upper and lower positions, each holder 42 being made rotative around the vertical axis (the X-axis). The lower cup is connected to a suction unit (not shown) so as to be capable of adsorbing the golf ball GB. The seventh station ST6 is a station for receiving the golf ball GB from the sixth station ST5 of the attitude modifying apparatus 100. The eighth station ST7 is a station for photographing the golf ball GB while rotating the same around the vertical axis (the X-axis) one time so as to confirm whether or not the equator having burrs formed thereon is placed horizontally. A lighting unit 43 for irradiating the golf ball GB with light and a CCD camera 44 for photographing the golf ball GB are disposed adjacent to the eighth station ST7. The ninth station ST8 is an idle station that does not perform any operation required for the golf ball GB.

The tenth station ST9 is a station for grinding burrs of the golf ball GB. A completion cutter 47 is secured to the upper surface of a supporting frame 45 while being pressed against the tenth station ST9 under appropriate pressure by a spring 46. A pair of copy rollers 48 are respectively disposed above and under the completion cutter 47, the copying rollers 48 being brought into contact with the halfway of the golf ball GB. An L-shaped supporting arm 49 is so disposed as to be capable of swinging relative to a supporting shaft 50 disposed in the elbow portion of the supporting arm 49. The supporting arm 49 has, an end thereof, a friction wheel 51 so disposed under the holder 42 corresponding to the tenth station ST9 as to be brought into contact with a vertical rotational shaft of the holder 42. A motor 53 for rotating the friction wheel 51 through a rope 52 is disposed just below the elbow portion of the supporting arm 49. A spring 54 for pressing the friction wheel 51 into a direction of the rotational shaft of the holder 42 is disposed adjacent to another end of the supporting arm 49. An eccentric cam 55 is positioned in contact with the foregoing end of the supporting arm 49. When the eccentric cam 55 is rotated by a predetermined angle, the supporting arm 49 can be inclined so that the friction wheel 51 is separated from the rotational shaft of the holder 42.

The eleventh station ST10 is a station for discharging the golf ball GB, from which burrs have been ground by the tenth station ST9, the foregoing golf ball GB being discharged as an allowable product. The twelfth station ST11 is a station for discharging the golf ball GB, which has been discriminated by the eighth station ST7 that the equator having burrs formed thereon is not horizontal, the foregoing golf ball GB being discharged as no good product. The golf ball GB discharged as no good product from the twelfth station ST11 is returned to the first station ST0 so as to be supplied again.

Figure 6:
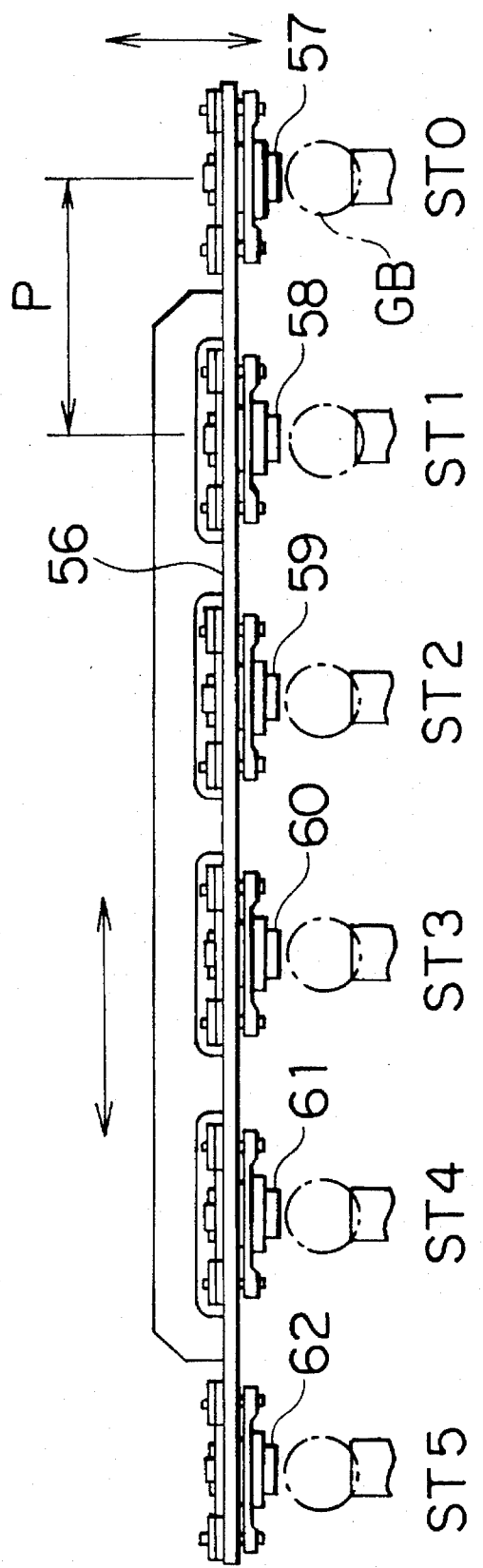
FIG. 6 is a front view showing a conveyance arm.

A conveyance unit having a conveyance arm 56, for example, as shown in FIG. 6, is disposed just above the seven stations ST0 to ST6 disposed straight from the first station ST0 of the attitude modifying apparatus 100 to the seventh station ST6 of the grinding apparatus 200. The conveyance arm 56 has six adsorption cups 57 to 62 disposed at pitch P, which is the same as the pitch of the disposed stations ST0 to ST6, each of the adsorption cups 57 to 62 being connected to suction units (not shown). The conveyance arm 56 is so structured as to be moved vertically and as well to be moved in the lengthwise direction for the distance corresponding to the pitch P by a drive unit (not shown). As a result, the conveyance arm 56 is enabled to simultaneously hold six golf balls GB to place the same on the corresponding stations. Furthermore, the conveyance arm 56 is capable of moving the golf balls GB to adjacent stations. For example, when the golf balls GB placed in the first to sixth stations ST0 to ST5 are held by the adsorption cups 57 to 62 and, in this state, the conveyance arm 56 is moved to the left by the pitch P, the golf balls GB in the adsorption cups 57 to 62 can be placed on the second to the seventh stations ST1 to ST6.

Figure 7:
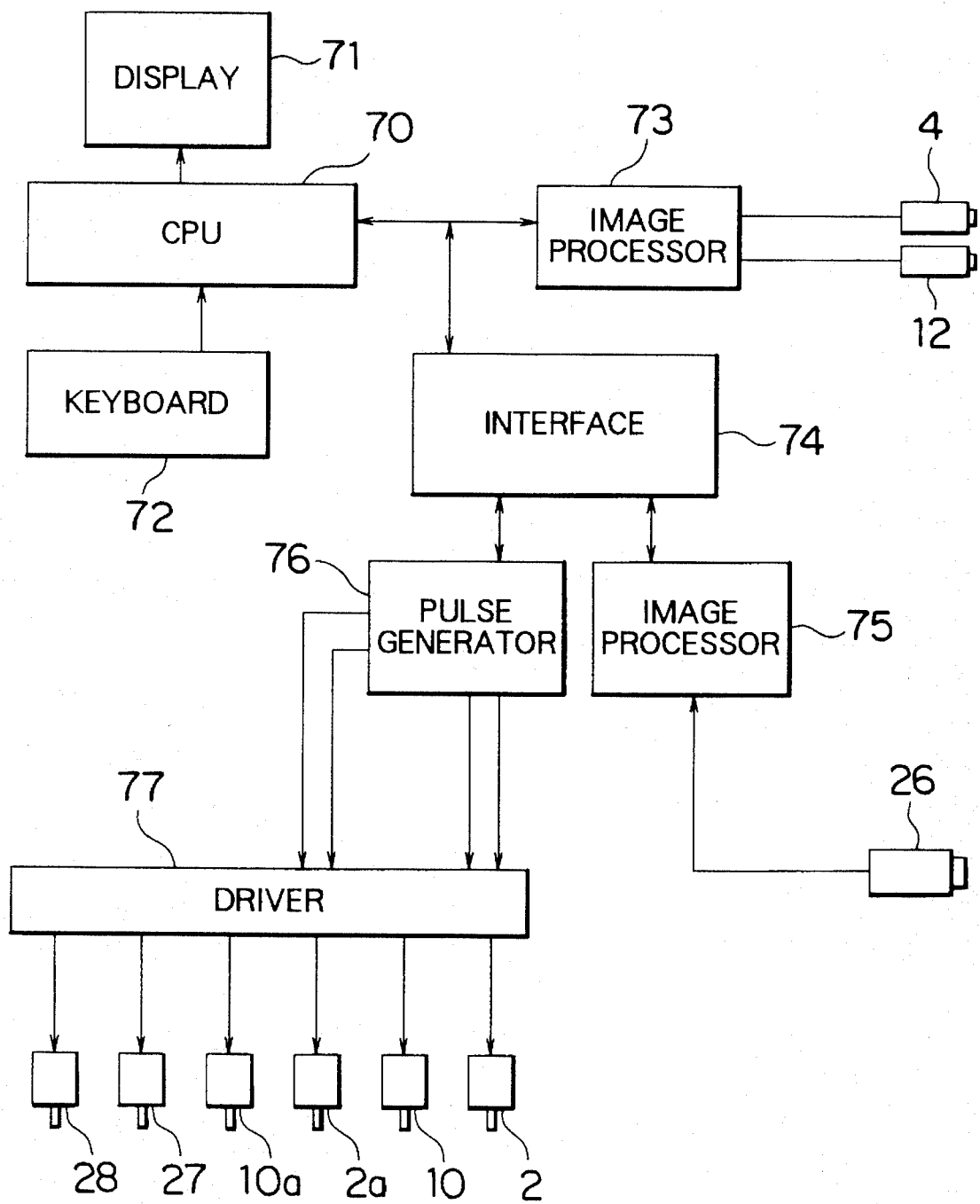
FIG. 7 is a block diagram showing the structure of a calculating unit.

FIG. 7 is a block diagram showing a calculating unit provided for the deburring machine according to the present invention. A display 71 and a keyboard 72 are connected to a CPU 70. Furthermore, the CCD camera 4 of the first photographing unit and the CCD camera 12 of the second photographing unit are connected to the CPU 70 through an image processor 73. In addition, an image processor 75 and a pulse generator 76 are connected to the CPU 70 through an interlace 74. The CCD camera 26 of the third photographing unit is connected to the image processor 75. A driver 77 is connected to the pulse generator 76, and the step motors 2 and 10 of the first and second rotating units, step motors 2a and 10a of the first and second modifying units and step motors 27 and 28 of the line adjustment unit are connected to the foregoing driver 77.

Figure 8:
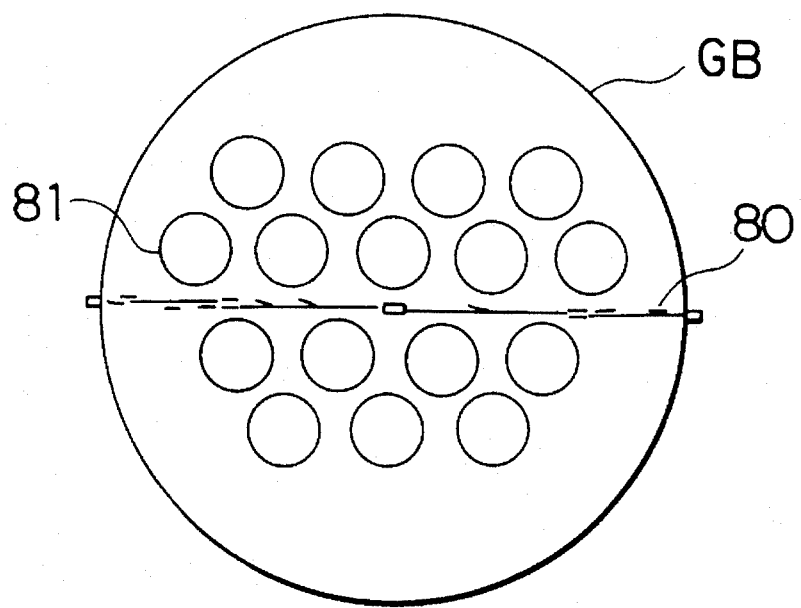
FIG. 8 is a front view showing a golf ball having burrs formed thereon.

The operation of the deburring machine according to this embodiment will now be described. Initially, golf balls GB are sequentially supplied to the first station ST0 from the previous process. Since the golf balls GB have been resin-molded by a pair of molds, burrs 80 are formed on one equator of each golf ball GB as shown in FIG. 8. Furthermore, a plurality of dimples 81 are formed on both sides of the equator while being arranged as designed. When the golf ball GB has been conveyed from the first station ST0 to the second station ST1 by the conveyance arm 56, the golf ball GB is sucked by the suction unit so as to be secured to the upper portion of the cup 6, followed by being rotated one time around the vertical axis by the step motor 2. At this time, the golf ball GB is photographed by the CCD camera 4 of the first photographing unit so that image data is taken.

Figure 9:
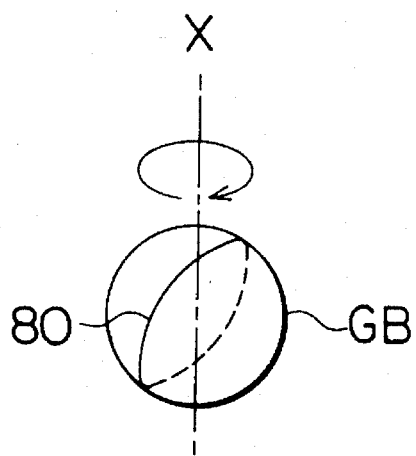
FIG. 9 is a perspective view showing a state of a golf ball which is rotated by the first rotating unit.
Figure 10:
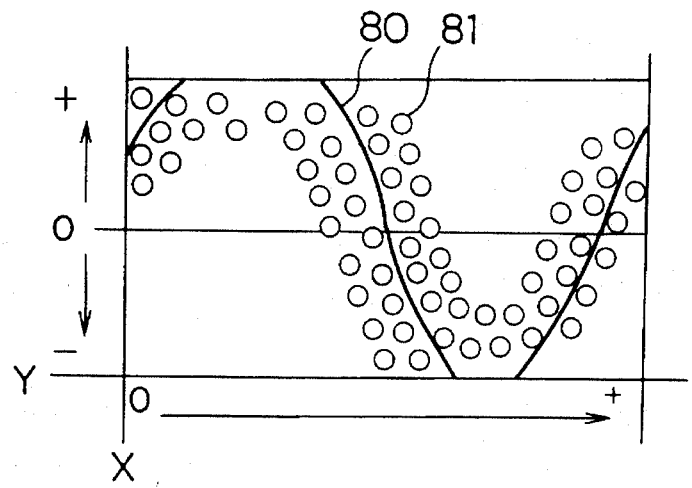
FIG. 10 is a graph showing image data obtained by a first photographing unit.
Figure 11:
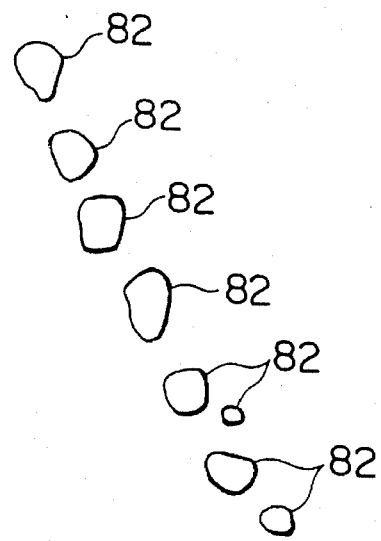
FIG. 11 is a diagram showing an image pattern of photographed burrs.
Figure 12:
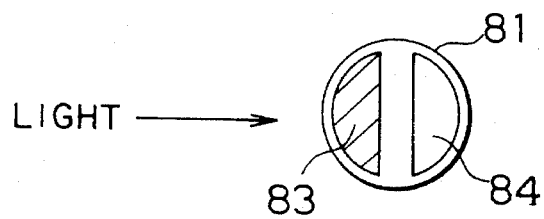
FIG. 12 is a diagram showing an image pattern of photographed dimples.

Since the golf ball GB is unconditionally supplied to the first station ST0, the equator having the burrs 80 formed thereon is, as shown in FIG. 9, usually inclined from the horizontal plane when the golf ball GB is, in the second station ST1, rotated around the X-axis. If the golf ball GB is, in the foregoing state, photographed by the CCD camera 4 from the horizontal direction, image data as shown in FIG. 10 can be obtained. Note that the burrs 80 are taken in the form of shade and shadow realized due to irradiation with light emitted from the lighting unit 3 of the first photographing unit so that a plurality of irregular shape patterns 82 as shown in FIG. 11 appear. Each dimple 81 appears to be formed into a pair of a shade and shadow portion 83 and a reflection portion 84 as shown in FIG. 12 due to irradiation with light emitted from the lighting unit 3. The CPU 70 of the calculating unit receives the foregoing image data through the image processor 73, and then calculates the position D (Xi, Yi) of the dimple 81 and the position F (Xj, Yj) of the burr 80 on a two-dimensional coordinates. At this time, each of the positions of the dimple 81 and the burr 80 is positioned at the center of gravity of the image pattern.

Figure 13:
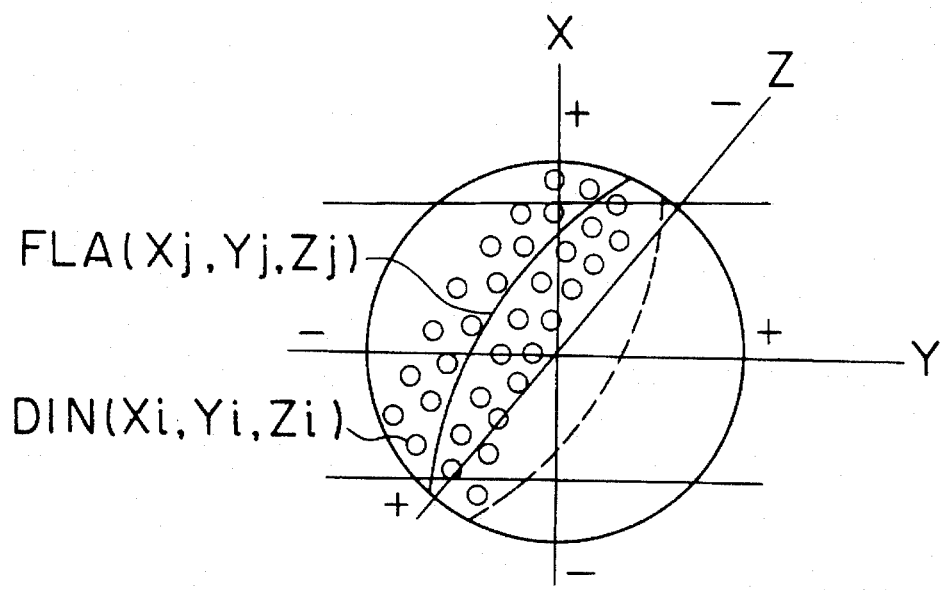
FIG. 13 is a graph showing image data expressed in three-dimensional coordinates.

Then, the CPU 70 converts the two-dimensional coordinates of the dimple 81 and the burr 80 into three-dimensional coordinates, for example, as shown in FIG. 13 so as to calculate the coordinate data DIN (Xi, Yi, Zi) of the dimple 81 and the coordinate data FLA (Xj, Yj, Zj) of the burr 80.

Figure 14:
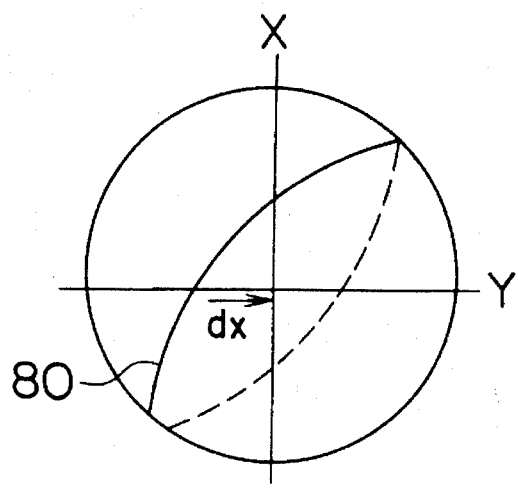
FIG. 14 is a graph showing rotational angle dx around the X-axis.
Figure 15:
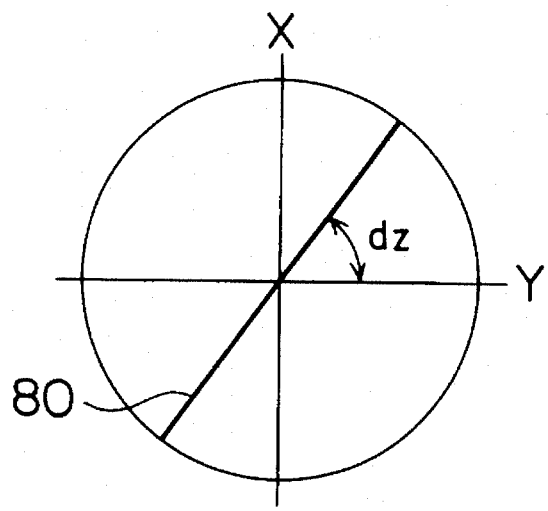
FIG. 15 is graph showing rotational angle dz around the Z-axis.
Figure 16:
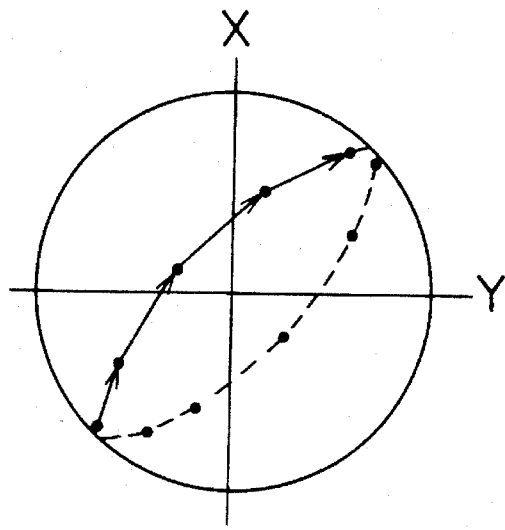
FIG. 16 is a graph showing a plurality of segments formed by sequentially connecting a plurality of points indicating burrs.

By using the three-dimensional coordinates above, rotational angle dx is obtained which is required for the respective points indicating the burrs 80 to be aligned on a straight line drawn through the origin when the golf ball GB rotated around the X-axis is viewed from the direction of the Z-axis, as shown in FIG. 14. Furthermore, the inclination (the angle made from the Y-axis) dz of a straight line, as shown in FIG. 15, indicating the burr 80 when viewed from the direction of the Z-axis is obtained. The discrimination is performed here that the respective points indicating the burrs have been aligned when the standard deviation of the directions (angles made from the Y-axis) of a plurality of segments sequentially drawn through a plurality of points indicating the burrs 80 is minimized, as shown in FIG. 16.

Figure 17:
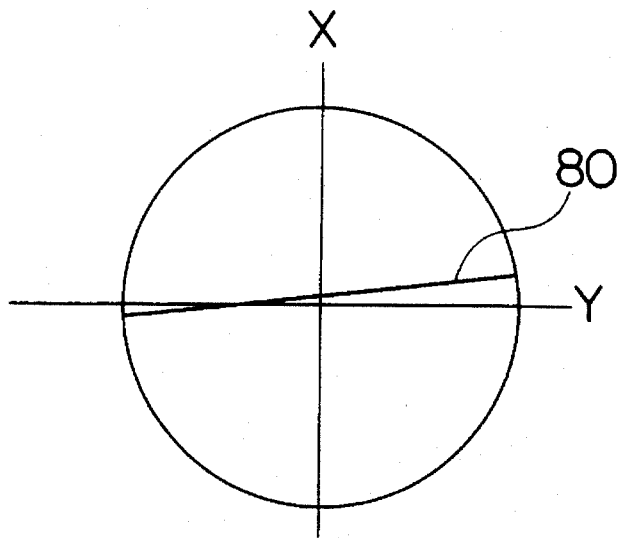
FIG. 17 is a graph showing an error in modifying the attitude.
Figure 18:
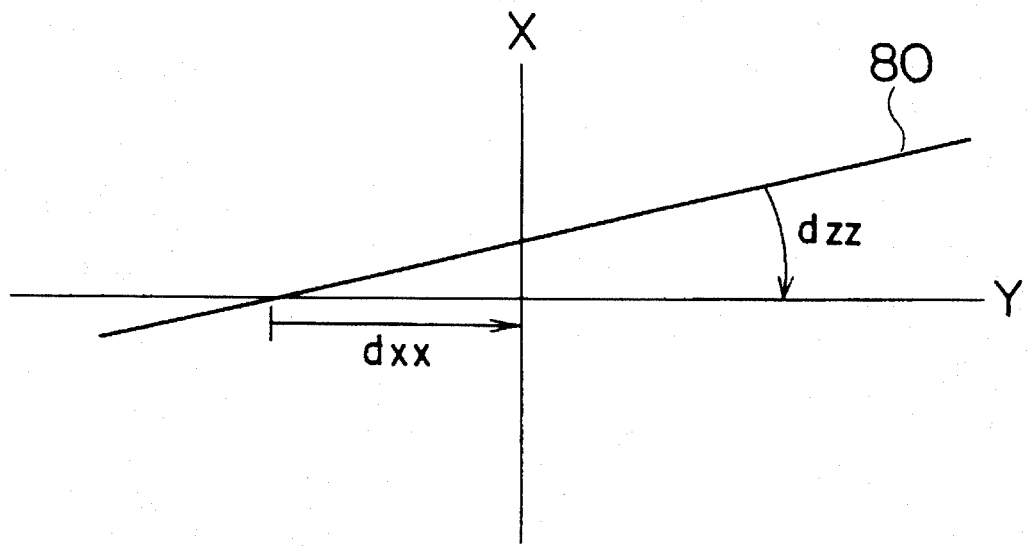
FIG. 18 is a graph showing correction quantities dxx and dzz for correcting an error in modifying the attitude.

By using thus-obtained dx and dz, the CPU 70 rotates the coordinate data of the golf ball GB around the X-axis by the angular degree of dx and as well as rotates the same around the Z-axis by the angular degree of dz. Since the shade and shadow of the burr 80 are used to deduce the position of the burr 80 as described above, the equator having the burrs 80 formed thereon cannot be made completely horizontally and therefore an error is made, as shown in FIG. 17. To accurately locate the equator, the positions of the dimples 81 arranged on the two sides of the equator to form a predetermined pattern are used in such a manner that correction quantity dxx of the rotational angle around the X-axis and correction quantity dzz of the rotational angle around the Z-axis further required to make the equator to be horizontal are calculated as shown in FIG. 18. Then, the foregoing correction quantities are added so that novel rotational angles DX=dx+dxx and DZ=dz+dzz are calculated.

Then, the golf ball GB is conveyed from the second station ST1 to the third station ST2. If the foregoing rotational angles DX and DZ have been calculated in accordance with image data received at the second station ST1, the third station ST2 does not rotate and photograph the golf ball GB. If the rotational angles DX and DZ could not be calculated due to unsatisfactory taking, as image data, of the shade and shadow of the burr 80 in accordance with the image data obtained at the second station ST1, the third station ST2 rotates the golf ball GB one time around the Z-axis to take the image data, and then the rotational angles DX and DZ are calculated similarly to the foregoing calculation.

The golf ball GB is conveyed to the fourth station ST3 by the conveyance arm 56. At this time, an instruction to make the rotational angle DX is issued to the pulse generator 76 from the CPU 70 of the calculating unit through the interface 74. Thus, the step motor 2a of the first modifying unit is rotated through the driver 77 so that the golf ball GB is rotated around the X-axis by an angular degree of DX. Then, the golf ball GB is conveyed to the fifth station ST4 at which an instruction to make the rotational angle DZ is issued to the pulse generator 76 from the CPU 70 of the calculating unit through the interface 74. Thus, the step motor 10a of the second modifying unit is rotated through the driver 77 so that the golf ball GB is rotated around the Z-axis by an angular degree of DZ.

Since the CCD camera 4 of the first photographing unit is disposed to make an angle of 30 from a straight line drawn through the first to sixth stations ST0 to ST5 and the CCD camera 4 is therefore shifted from the Z-axis by 15, the foregoing shift is added so that DX is calculated as the rotational angle that causes the equator having the burrs 80 formed thereon to be a straight line drawn through the origin when viewed from the direction of the Z-axis.

Figure 19:
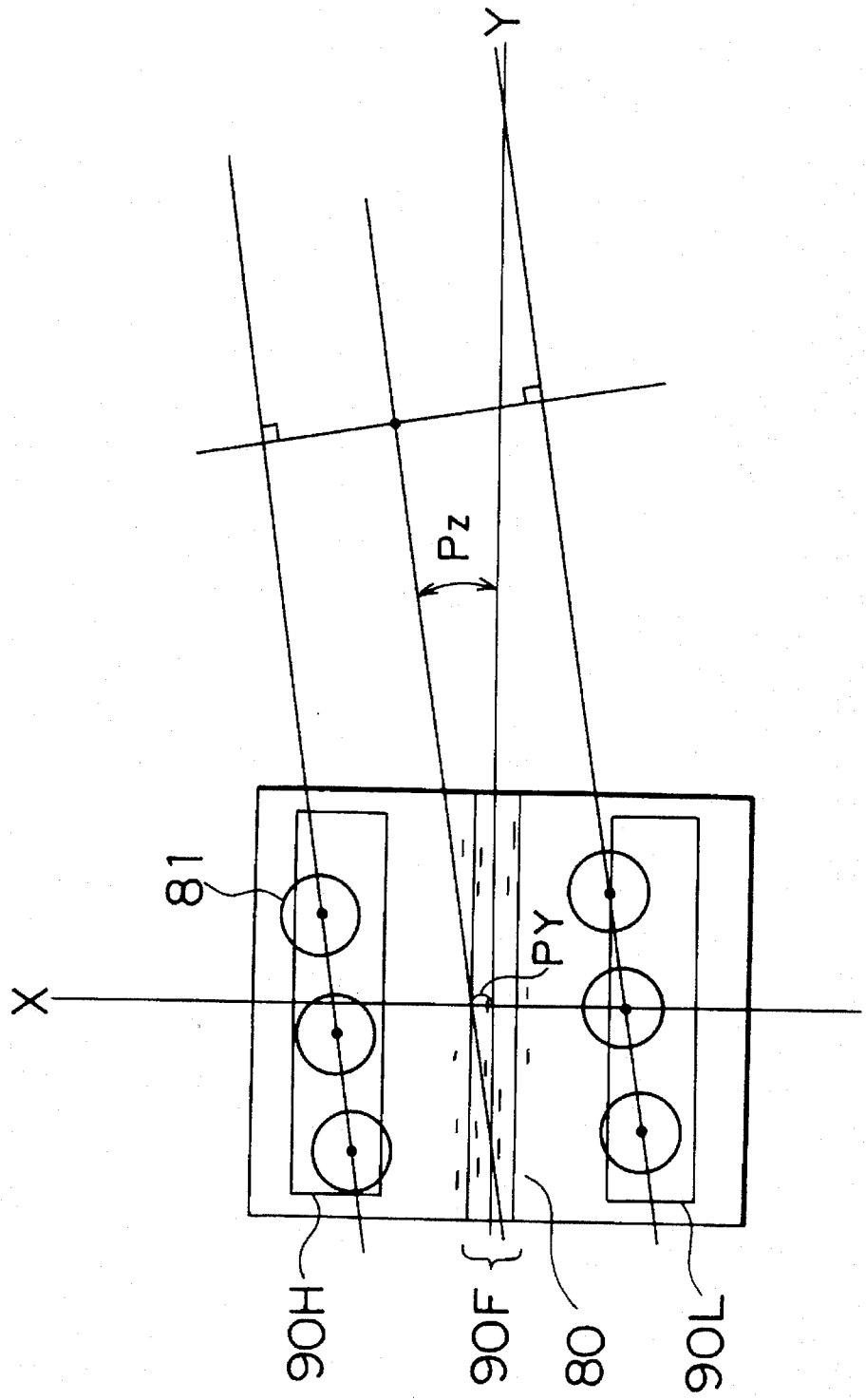
FIG. 19 is a diagram showing the inclination of the equator plane in an image obtained by a third photographing unit.

Then, the golf ball GB is, by the conveyance arm 56, conveyed to the sixth station ST5, at which the fine adjustment is then performed by the fine adjustment unit. That is, as shown in FIG. 19, the CCD camera 26 of the third photographing unit takes image data of the golf ball GB to detect whether or not the burrs 80 exist in a detection frame 90F. If the overall area of the burrs 80 existing in the detection frame 90F is wider than a predetermined allowable value, a discrimination is performed that the burrs 80 exist. If the overall area is narrower than the predetermined value, a discrimination is performed that no burr exists. If the discrimination has been made that the burrs 80 exist in the detection frame 90F, the positions DIN (Xi, Yi, Zi) of the dimples 81 existing within the detection frames 90H and 90L are detected. Then, a determination is made that the equator having the burrs 80 formed thereon is positioned at the central position between the configuration line of the dimples 81 in the detection frame 90H and the configuration line of the dimples 81 in the detection frame 90L and as well as in parallel to the foregoing configuration lines. Thus, adjustment angle PY around the Y-axis for the equator plane and adjustment angle PZ around the Z-axis for the same are calculated.

The CPU 70 of the calculating unit issues an instruction to make the adjustment angles PY and PZ to the pulse generator 76 through the interlace 74. As a result, the step motors 27 and 28 of the fine adjustment unit are rotated through the driver 77 so that the golf ball GB is rotated by the angular degrees PY and PZ around the Y-axis and Z-axis respectively so as to be finely adjusted.

Thus, the golf ball GB, the attitude of which has been modified by the attitude modifying apparatus 100, is conveyed to the seventh station ST6 of the grinding apparatus 200 by the conveyance arm 56. The golf ball GB is held by the holder 42, and then it is moved to the eighth station ST7 when the circular dividing table 41 is rotated. Then, the CCD camera 44 photographs the golf ball GB to detect whether or not the equator plane having the burrs 80 formed thereof has been made horizontal.

Figure 20:
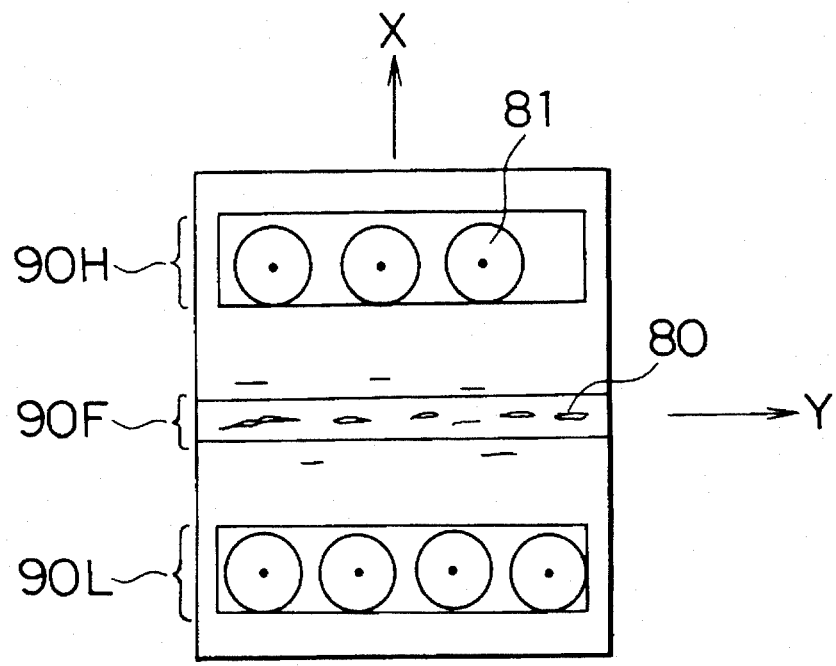
FIG. 20 is a diagram showing an image obtained by an eighth station of a grinding apparatus.
Figure 21:
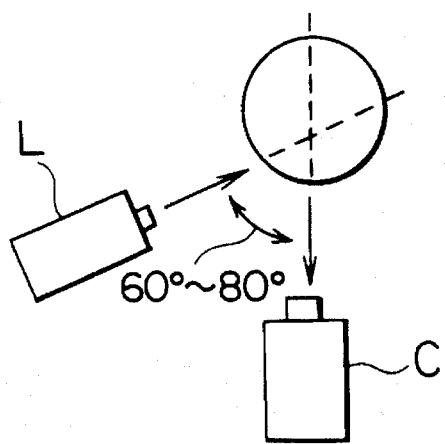
FIG. 21 is a diagram showing the relationship between a lighting unit and a camera of the photographing unit.

That is, as shown in FIG. 20, whether or not burrs 80 exist in the detection frame 90F is detected. If the overall area of the burrs 80 existing in the detection frame 90F is wider than a predetermined value, a discrimination is performed that the burrs 80 exist. If the are is narrower than the predetermined value, a discrimination is performed that no burr exists. If the discrimination that the burrs 80 exist in the detection frame 90F, the positions DIN (Xi, Yi, Zi) of the dimples 81 existing in the detection frames 90H and 90L are obtained to calculate the inclinations of the configuration lines of the dimples 81 in the detection frames 90H and 90L. At this time, the standard deviations of the X coordinates of all dimples 81 that have been confirmed in each of the detection frames 90H and 90L are calculated so as to obtain the inclination of the configuration line. If the inclination of the configuration line in the detection frame 90H and/or 90L exceeds an allowable value, a discrimination is performed that the equator plane is not horizontal. If both angles of inclination are smaller than a predetermined value, a discrimination is performed that the equator plane is horizontal.

When the circular dividing table 41 is then rotated, the golf ball GB is brought to the ninth station ST8, and then it is conveyed to the tenth station ST9. At the tenth station ST9, the friction wheel 51 is brought into contact with the rotational shaft of the holder 42 holding the golf ball GB, that has been discriminated at the eighth station ST7 that its equator plane having the burrs 80 formed thereon is horizontal. Furthermore, the friction wheel 51 pushes the rotational shaft toward the completion cutter 47 so that the halfway of the golf ball GB is pressed against the copy rollers 48. In the foregoing state, the motor 53 rotates the golf ball GB around the vertical axis and as well as rotates the completion cutter 47 to grind the burrs 80. The eccentric cam 55 is rotated to remove the friction wheel 51 from the rotational shaft of the holder 42 that is holding the golf ball GB that has been discriminated that its equator plane having the burrs 80 formed thereon is not horizontal but it is inclined. As a result, the golf ball GB is not ground.

The golf ball GB, from which the burrs have been ground, is, as an allowable product, discharged from the eleventh station ST10. On the other hand, the golf ball GB, from which the burrs have not been ground because its equator plane has been inclined, is not discharged from the eleventh station ST10, but the golf ball GB of this type is discharged from the twelfth station ST11 as a no good product. The golf ball GB discharged as the no good product is again supplied to the first station ST0 of the attitude modifying apparatus 100.

If the results of the calculations of the levelness of the equator plane performed by the eighth station ST7 are fed back to the CPU 70 of the calculating unit, a mechanical shift or the like of, for example, the conveyance system can be corrected.

It is preferable that the lighting unit L and the camera C be disposed to make an angle of 60 to 80 from each other in each photographing unit. In this case, image data of burrs and dimples can satisfactorily be taken.

As described above, the apparatus for modifying the attitude of a golf ball having burrs formed thereon enables the attitude of the golf ball to be automatically modified in such a manner that the equator having burrs formed thereon faces a predetermined direction.

The deburring machine according to the present invention enables the attitude of a golf ball to be automatically modified to remove burrs.

What is claimed is:

1. An apparatus for modifying the attitude of a golf ball having burrs formed thereon, comprising:

rotating means for rotating, one time, a golf ball, which has burrs formed on the equator thereof, around an axis that passes through the center of the golf ball while holding the golf ball;

photographing means for photographing the golf ball rotated one time by said rotating means;

calculating means for recognizing the position of the equator having burrs formed thereon in accordance with image data of the golf ball obtained by said photographing means and for calculating the quantity of rotation required to modify the equator into a predetermined direction; and modifying means that rotates the golf ball by the quantity of rotation calculated by said calculating means to modify the attitude of the golf ball.

2. An apparatus for modifying the attitude of a golf ball according to claim 1 wherein said rotating means includes a first rotating unit for rotating, one time, the golf ball around a first axis of a three-dimensional coordinates, the origin of which is the center of the golf ball, and a second rotating unit for rotating, one time, the golf ball around a second axis which is perpendicular to said first axis, said photographing means includes a first photographing unit for photographing the golf ball which is rotated by said first rotating unit and a second photographing unit for photographing the golf ball which is rotated by said second rotating unit, said calculating means calculates the quantity of rotation required for modification in accordance with image data if the position of the equator having burrs formed thereon has been recognized in accordance with the image data obtained by said first photographing unit, and if the position has not been recognized, then said calculating means uses image data obtained by said second photographing unit to recognize the position of the equator having burrs formed thereon and to calculate the quantity of rotation required for the modification.

3. An apparatus for modifying the attitude of a golf ball according to claim 1 wherein said modifying means includes a first modifying unit for rotating the golf ball around a first axis of a three-dimensional coordinates, the origin of which is the center of the golf ball, and a second modifying unit for rotating the golf ball around a second axis which is perpendicular to said first axis.

4. An apparatus for modifying the attitude of a golf ball according to claim 1 further comprising: a third photographing unit for photographing the golf ball, the attitude of which has been modified by said modifying means, and a fine adjustment unit for finely adjusting the attitude of the golf ball, said calculating means discriminating whether or not the equator having burrs formed thereon faces a predetermined direction in accordance with the image data obtained by said third photographing unit and causing said fine adjustment means to finely adjust the attitude of the golf ball if the equator is shifted from a predetermined direction.

5. An apparatus for modifying the attitude of a golf ball according to claim 4 further comprising conveyance means for conveying the golf ball in a sequential order as said first rotating unit, said second rotating unit, said first modifying unit, said second modifying unit and said fine adjustment unit.

6. An apparatus for modifying the attitude of a golf ball according to claim 1 wherein said calculating means recognizes the position of the equator having burrs formed thereon in accordance with the shade and shadow of the burrs, then calculates the positions of dimples arranged on the two sides of the recognized equator, and then uses the positions of the dimples to correct the position of the equator.

7. An apparatus according to claim 1 further having:

a grinding apparatus that holds the golf ball from a direction perpendicular to the equator plane caused to face the predetermined direction by said modifying means and that presses the halfway of the golf ball against copying rollers while rotating the golf ball so as to bring the equator having the burrs formed thereon into contact with a completion cutter so that the burrs are removed.

8. An apparatus according to claim 7, wherein said grinding apparatus has a rotative circular dividing table, and a plurality of holders disposed around said circular dividing table at same intervals and arranged to rotatively, around a vertical axis, hold the golf balls, the attitude of each which has been modified by said attitude modifying apparatus.

9. An apparatus according to claim 7 further having a fourth photographing unit for photographing the golf ball held by said holder of said grinding apparatus.

10. An apparatus according to claim 1 wherein said photographing means is an electronic camera.

11. An apparatus according to claim 10 wherein said calculating means is an electronic computer.

12. An apparatus according to claim 1 wherein said calculating means is an electronic computer.

13. A method of rotating a golf ball prior to placing it in a machine for removing burrs formed at an equator of such ball, such equator having burrs formed by joint surfaces of a mold wherein such ball is formed, said method comprising the steps of:

(a) placing such ball at a station wherein it is rotated about a first axis;

(b) photographing such ball while it is rotated about such first axis to obtain image data indicative of an orientation of such equator;

(c) processing said data indicative of an orientation of such equator to calculate an angle for rotation of such golf ball about a second axis not parallel to said first axis to orient such golf ball more suitably for burr removal; and (d) rotating said golf ball through said angle about said second axis.

14. A method according to claim 13 wherein said steps (a), (b), (c) and (d) are performed a plurality of times to rotate said golf ball about a plurality of axes not parallel to each other.

15. A method according to claim 14 further comprising the step of rotating such ball to a position in which such equator is in a known plane.

16. A method according to claim 14 wherein said first direction for illuminating and said second direction for photographing are at an angle of about 60 to 80 degrees relative to each other.

17. A method according to claim 13 wherein step (b) further includes the steps of illuminating such ball from a first direction, and photographing such ball from a second direction; and wherein step c includes the step of using shade and shadow of such burrs to determine said orientation of such equator.

* * * * *